United States Patent [19]

Kelly

[11] 4,256,060
[45] Mar. 17, 1981

[54] MANIFOLD HYDROGEN GENERATOR UNITS FOR AUTOMOTIVE I.C. ENGINES

[76] Inventor: Donald A. Kelly, 58-06 69th Pl., Maspeth, New York, N.Y. 11378

[21] Appl. No.: 66,243

[22] Filed: Aug. 13, 1979

[51] Int. Cl.³ ............................................. F02B 43/08
[52] U.S. Cl. ................................. 123/3; 123/DIG. 12; 48/81; 48/102 A
[58] Field of Search ................. 123/3, 1 A, DIG. 12; 48/81, 64, 65, 66, 102 A

[56] References Cited

U.S. PATENT DOCUMENTS

| | | | |
|---|---|---|---|
| 1,966,345 | 7/1934 | Harrell | 123/3 |
| 3,653,364 | 4/1972 | Bogan | 123/3 |
| 3,682,142 | 8/1972 | Newkirk | 123/3 |
| 3,717,129 | 2/1973 | Fox | 123/3 |
| 4,086,877 | 5/1978 | Henkel | 123/DIG. 12 |

OTHER PUBLICATIONS

"Partial Hydrogen Injection", by Breshears, Cotrill and Rupe, JPL Lab., Oct. 14, 1973.

Primary Examiner—Ronald B. Cox

[57] ABSTRACT

The manifold hydrogen generator units for automotive I. C. engines are intended to provide a supplementary hydrogen fuel supply for conventional automotive I. C. engines, in addition to any primary fuel including gasoline, gasohol or hydrogen.

The hydrogen is produced in a three stage process starting with the conversion of water to steam by means of multiple coils of copper tubing closely fitted to the exhaust manifold(s) of the I. C. engine. The steam is directed into one or two reactor cylinders containing rotating wire brushes axially disposed within the reactor cylinder(s) which remove a portion of the oxygen through progressive oxidation of the iron wire brushes. Periodic forced purging of the wire brushes is provided by combined aeration and vibrating of the rotating brushes.

A final reforming stage of the partially reformed steam/hydrogen flow is obtained by steel wool packs which are periodically replaced.

10 Claims, 8 Drawing Figures

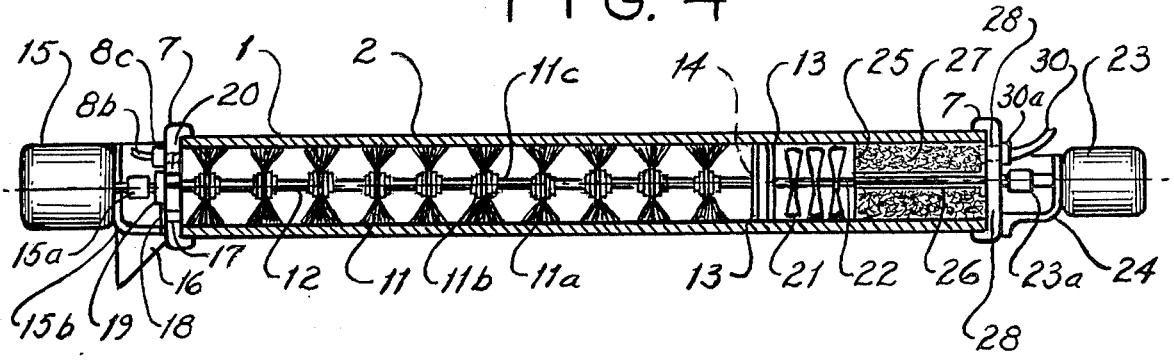
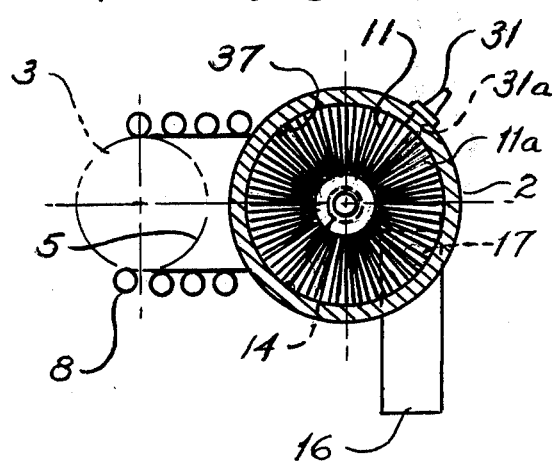
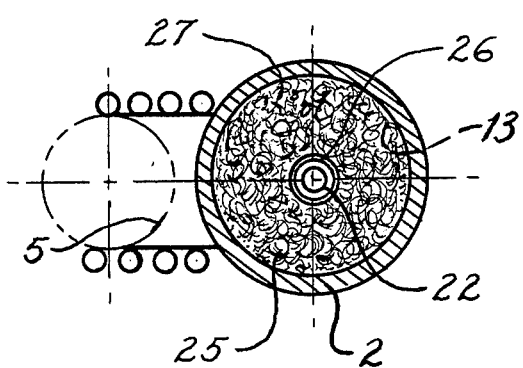
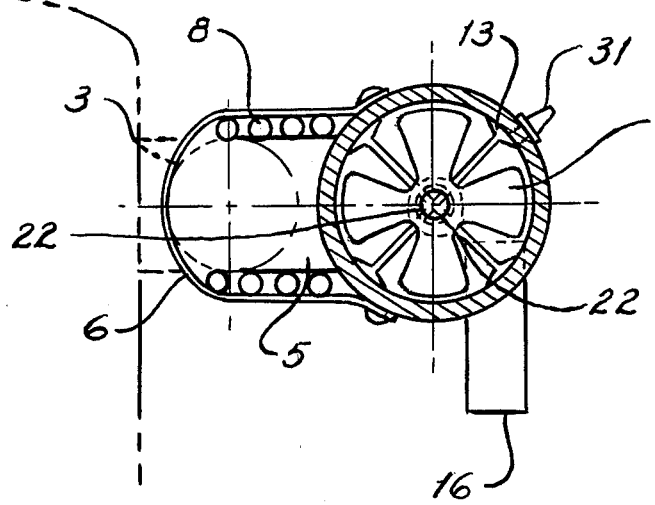
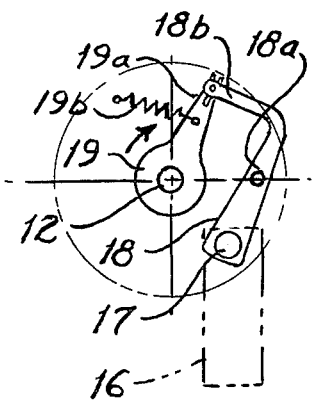

MANIFOLD HYDROGEN GENERATOR UNITS FOR AUTOMOTIVE I.C. ENGINES

BACKGROUND OF THE INVENTION

The use of hydrogen gas as a supplemental fuel in addition to gasoline or gasohol offers some distinct advantages for present and future motor vehicle operation in the light of constantly increasing gasoline prices and projected supply diminishment. Hydrogen fuel can be readily adapted for use in conventional automotive I.C. engines with only minor adjustments necessary for its proper combustion along with gasoline or gasohol.

Since hydrogen gas burns cleanly with water vapor left as the major exhaust component, the total exhaust emission levels from such combined fuel for the engine will be correspondingly lower. These two advantage alone should be more than enough for hydrogen fuel to gain wide scale acceptance as a supplementary automotive fuel, but in addition hydrogen can be readily generated on-board the vehicle with retrofitted components, unlike any other fuel means now known.

The main effort towards the development of practical automotive hydrogen fueled vehicles has been by way of the storage of the gas on board the vehicle as the primary fuel source. The most prominent method used for the storage of the gas has been the utilization of various types of metal hydrides,-which act as hydrogen gas "sponges" to absorb and release the gas as required.

Such groups as Brookhaven Labs, Billings Corporation, and Mercedes Benz have adopted this on-board hydrogen storage method because of its workability, basic safety and useful gas volume storage capacity.

With the advent of iron-titanium hydride (Ti-Fe), developed at Brookhaven Laboratories, the on-board $H_2$ storage approach for vehicular applications has become practical, since hydrogen can be absorbed and released from the storage volume at relatively low temperatures and pressures. While these various plus features for hydride storage make its use attractive for many vehicular applications there remains the major problem of hydrogen distribution to motorists which will be decades away from realization, if at all. The hydrogen distribution problem means that automotive hydrogen storage alone, cannot be considered as a short-term solution to ever increasing gasoline prices and the progressively decreasing supply.

The wide scale distribution of hydrogen as an automotive fuel will require long term capital investment by the industry, while on the other hand, on-board hydrogen generation equipment is centered on the first cost of operating components only, which do not now appear to be beyond the range of reasonable first cost amortization, based on the long-term gasoline cost savings involved.

Various types of hydrogen fueled vehicles have been proposed and described over the years with the prospects of substituting this minimum polluting fuel for high cost, polluting gasoline fuel, as presently used. There has been considerable reluctance towards the acceptance of hydrogen as a fuel because it is believed to be dangerous to handle and use,-(the Hindenburg syndrome) but if carefully generated and used immediately in minimum volumes, adequate safety is assured.

Considerable theoretical work has been done toward utilizing hydrogen as an alternate fuel for conventional I.C. engines with numerous hydrogen generation and storage methods proposed and developed. All of the economically practical and experimental methods for hydrogen generation have been described in about twenty prior U.S. and foreign patents for alternate vehicular propulsion. Several of these prior patents deal with heat recovery from the engine exhaust manifolds to drive various types of closed cycle engine loops, which in turn are used to provide a low voltage D.C. power source required for conventional electrolysis cells, as the hydrogen generation means.

Another on-board hydrogen generation means which has received moderate attention and prototype development effort is the gasoline reforming process in which a small flow volume of gasoline is broken down into its basic components in a thermal reactor, with hydrogen gas produced along with varying amounts of hydrocarbon by-products. Successful prototypes have been evolved using this process, but the present equipment is cumbersome and will require extensive size reduction and improvement before any possible commercialization stage is reached.

It should be realized that the gasoline reforming process for automotive applications starts out with a negative position, since it takes away a small portion of the total gasoline flow which we are attempting to conserve as an overall goal for an economical automotive supplemental fuel system.

The electrolysis process for automotive applications, previously mentioned, is not handicapped in this way, as it is clearly separate from the primary fuel supply, and although it is mainly dependent on I.C. engine operation, it is not dependant on the primary fuel means in any way. The major problem facing on-board hydrogen generation using the electrolysis process is that of the very large electrical wattage required and the relatively slow rate of hydrogen flow produced which is not now compatible with normal I.C. engine operation.

In a modifided steam-on-iron hydrogen generation process,—Bogan,—U.S. Pat. No. 3,653,364, has described the adaptation of this known $H_2$ industrial process to an automotive application. Although this process art is novel in several respects it does not solve all the different problems involved in such a limited space and operating environment for this normally large scale industrial process. Firstly, the steam-on-iron process usually operates with the best effectiveness in the superheated steam ranges which are not economically possible for any automotive applications. Another major difficulty not considered in this art is that of the intermittant deoxidation/aeration of the iron volume-(contact mass), which is not feasible with stationary small iron balls, as described.

The oxidation of all the iron balls will gradually diminish as they all become fully rusted and the hydrogen liberation will correspondingly diminish and eventually come to a halt. If all of the small iron balls are uniformly agitated and periodically abraded to remove the rust-/and/or accumulations in some way, then this method may be reasonably succesful for nearly continuous operation if a high temperature steam flow is provided within a suitable reaction unit.

High energy levels are required to produce the necessary steam reforming, and while a portion of the required heat energy can be recovered from the exhaust manifold(s), as described by Bogan, an additional high heating source will be required to maintain the thermal reaction for an automotive version of this industrial process. The use of electrical resistance heaters powered by the vehicle's only battery, as described by Bogan, is not considered practical in view of their constant high discharge rate from the single battery in the vehicle. It is not feasible to heat water into steam by electrical resistance heating as described by Bogan, and a more practical approach must be sought to produce the necessary steam flow.

In an earlier U.S. Pat. No. 1,966,345, by Harrell, iron filings are fully packed within a pipe section centrally located inside the exhaust manifold of an auto engine. A small steam flow is produced within the exhaust manifold from a raised water reservoir which gravity feeds a small water flow into the manifold and pipe section. While the steam flow over the iron filings will produce hydrogen liberation, again no provision for periodic purging is evident in this hydrogen generation arrangement, so that it falls short of a practical and continuous supplementary hydrogen fuel system for vehicles. This earlier art is more effective from the standpoint of heat transfer than the art of Bogan, since the iron filings within the pipe section is fully enclosed within an enlarged special exhaust manifold on a conventional I.C. automotive engine. The art of Bogan does not take the fullest advantage of the hot exhaust manifold(s) as does Harrell's art.

It can be appreciated that the very high exhaust manifold temperatures are attractive heat sources especially when no operating performance penalty is imposed on the vehicles engine or drive train. In spite of this attractive heat source for hydrogen liberation by steam reaction, an additional heat source will be required for a successful hydrogen fuel flow by this known method. The use of several electrical resistance ce heaters as the added heating means can be considered only if a second 12 volt automotive battery is included along with a constant and reliable recharging means for this second battery.

Such unusual electrical sources as thermoelectric and photovoltaic cells and air driven generators revolved by the moving vehicle can be useful electric recharging sources for this specific application. Since the multiple electrical heaters cause a large electrical drain on the secondary battery, it will be necessary to provide electrical recharging from all three electrical sources previously described.

The authority for the contention that an effective deoxidation aeration phase for the steam-on-iron process is necessary comes from "Bailey's Industrial Oil and Fat Products,"—Third Edition,—on Hydrogenation, Pg. 851, ie: "Failure to remove these accumulations-(carbon, sulfur, rust) results in virtually complete inactivation of the control mass (iron balls, iron fillings)." "It is customary to follow each steaming period with a short period of aeration (purging) during which time air is blown through the ore (constact mass) to burn off the carbon and sulfur accumulations."

While the purging of the contact iron mass in the industrial process can be readily accomplished, it becomes a difficult task to achieve for an automotive-sized unit(s) where both a lack of space along with purging provision and effectiveness become major difficulties.

SUMMARY OF THE INVENTION

The manifold hydrogen generator units for automotive I.C. engines are advocated as a means of substantially reducing the gasoline fuel consumption in conventional I.C. engine powered vehicles of all types. This present arrangement offers a practical way of adopting hydrogen gas as a supplementary or primary automotive fuel, and envisions 100% hydrogen utilization for many automotive applications during the twenty-first century.

The small hydrogen gas flow volume to the automotive I.C. engine provided by this system is produced in a three stage process, with the first being the conversion of water into steam by means of multiple turns of small diameter tubing around the engine's exhaust manifold(s). The multiple turns of tubing must be closely wound and in full contact with the exhaust manifold(s), either spirally or longitudinally depending on the type of manifold and available clearance space around it. Most current automotive engine exhaust manifolds have various adjacent components around them which complicate the clear placement of the water-steam tubing so that the method of tubing application must be kept flexible, and easily removably if possible.

Several water containers for the water supply to the tubing inlet must be mounted as high as practical within the engine compartment so that a constant gravity feed water supply to the water/steam tubing is maintained. The water supply to the tubing inlet must enter at the rear of the manifold(s) with a minimum of 2½ turns (longitudinal) around the manifold with the steam exit end of the tubing at the front of the exhaust manifold(s). If the tubing is spirally wound around the exhaust manifold(s), a minimum of nine loops will be required, or three loops per manifold section of a V-eight cylinder I.C. engine. A straight upright six cylinder engine will accommodate a total of ten tubing loops, or two loops per manifold section.

The steam generated within the final tubing loop is directed into the front end of the reactor cylinder(s) where it flow through uniformly spaced rotary iron wire brushes closely fitted within the inside diameter of the iron reactor cylinder(s).

The reactor cylinder(s) are standard two inch or two and one-half inch diameter (I.D.) iron pipes approximately one and one-half feet long, fitted with two threaded and sealed end caps. Several conveyor fans are located toward the rear of reactor cylinder(s) to assure continuous steam/gas flow through the cylinders and into the engine's intake manifold.

The reactor cylinders are adapted to the engine's exhaust manifolds by means of matched adapter mounts which are elongated metal pieces with two opposite semi-circular concave cavities which match the outside diameters and shape of the exhaust manifolds and reactor cylinders, respectively. The adapter mounts are permanently fastened to the reactor cylinders and secured the the exhaust manifold(s) with several adjustable clamps.

When the water/steam tubing is in a longitudinal form it must partially cover the matched adapter mounts and partially contact the exhaust manifolds, but when the tubing is spirally wound around the manifolds then clearance for the tubing loops must be provided within the matched adapter mounts.

The wire brushes consist of multiple fine iron wires in a fairly dense radial form and held together by two hub discs. Each of the rotary brushes must lightly contact the reactor pipe I.D. so that all accumulations can be periodically removed. A central shaft connects all the rotary brushes together with the two hub discs cinched to the shaft. The wire brush shaft which does not normally revolve, is supported in sleeve bearings by the front end cap and an internal support spider, and is brought into contact with the constantly revolving rear conveyor fan shaft by a small solenoid mounted on the front end cap.

The front end cap also mounts the front steam entrance tubing line and front purging air funnel, along with the exhaust gas tubing line from the exhaust manifold(s).

A second internal support spider is required to support the conveyor fan shaft at the internal end while the other, rear end cap supports this shaft at the outer, rear end. A small D.C. motor and reduction gear train is secured to the rear end cap which revolves the conveyor fan shaft at a constant speed.

A coupling set is used to intermittently connect the conveyor fan shaft with the front wire brush shaft, which is reciprocated to be periodically driven by the rear conveyor fan shaft. A steel screen disc is located directly behind the last, rear conveyor fan to retain the steel wool pack which provides the final steam reforming stage of the reactor cylinder(s). The steel wool pack is retained by the rear end cap which is threaded and sealed on to the rear of the reactor pipe section.

A larger diameter outlet tubing connection is fitted to the rear end cap with the tubing routed to a convenient location on the intake manifold. This tubing line should be formed with generally large radii so that the gas flow is not impeded, and it must be well insulated so that the gas flow is not cooled excessively. It will be desirable to have a quick-connection fitting for the outlet tubing line, since the rear end cap must be periodically removed to replace the rusted steel wool packs.

The front purging air inlet funnel is formed as a rectangular air scoop facing forward to draw in and slightly compress the air flow, periodically, to coincide with the rotation of the multiple rotary wire brushes, actuated by the front solenoid. An air inlet gate at the base of the air inlet funnel is normally closed and will be opened by the front solenoid, as the rotary iron wire brushes are revolved. This combined action of the forced air inlet and the revolving of the brushes against the pipe inside diameter comprise the periodic purging phase of the process.

Approximately five electrical resistance heaters with threaded bases are uniformly located along the length of the reactor cylinder(s), and are screwed into the side wall, so that additional heating is available within the reactor cylinder to assure that a necessary high heating level is attained for the steam reforming process. These electrical heaters must be threaded into the reactor cylinders after the rotary brushes and conveyor fans are in place within the cylinder(s), and all removed prior to the removal of the rotary brush and conveyor fan assemblies for servicing.

The electrical resistance heaters receive electrical power from the second battery within the vehicle which is recharged by several electrical sources such as thermoelectric cells mounted on the exhaust pipes of the vehicle, multiple photovoltaic cells on the vehicle roof, and by multiple air-driven disc generators within the engine compartment of the vehicle.

A copper tubing line(s) of about the same diameter, (approximately ¼ inch) as the water/steam tubing is used to recycle a small portion of the exhaust gases within the rear of the exhaust manifold back to the entrance front end cap of the reactor cylinder(s). The exhaust gases, mainly carbon monoxide, are mixed with the incoming steam flow to produce a gas mixture which can be partially reformed into hydrogen gas and residual gases. It is important that both a high temperature and fairly high flow velocity be maintained for the mixing steam and exhaust gases passing through the main reactor section, so that the reforming gas mixture can pass through the final reforming steel wool packs stage without excessive impedance.

Several design variations from this previously described process unit(s) arrangement can be made to simplify or improve the performance of the process such as utilizing a small D.C. motor instead of the front solenoid, to intermittently revolve the rotary wire brushes. This substitution may prove to be more reliable since no reciprocation of the rotary wire brush shaft is involved, and no need for the meshing of the front and rear shafts at the couplings, as previously described. If this arrangement is adopted it will be necessary to have a manual control cable to open the front air inlet gate, at the same time that the switch is thrown to start the brush drive motor.

Another variation of the original arrangement could consist of adopting a manual control, simultaneously, for both the intermittent reciprocation of the rotary brush shaft and the opening of the front air inlet gate. Other variations and improvements on the original arrangement may be possible as the system/process is evolved.

In the first stage of operation, the water from the gravity-feed water containers is directed into the water/steam tubing loops where the hot engine exhaust manifold(s) convert it into steam in the last loop. The tiny steam flow is fed into the reator cylinder(s) in the second stage of the process, where it is mixed with a nearly equal flow volume of exhaust gases from the exhaust manifold(s).

This gaseous mixture is forced through the reactor cylinder(s) by the revolving conveyor fans toward the rear end of the cylinder(s), and is partially reformed by the partial oxidation of the multiple rotary iron wire brushes and the high heating level within the reactor cylinder(s).

In the third and final stage of the process, the partially reformed gaseous mixture is further reformed when the gaseous mixture is passed through the rear steel wool pack. The steel wool pack will become oxidized, so that the remaining gas flow contains a higher percentage of hydrogen gas from the steam/CO reinforcing process. This reformed gas flow is drawn into the engine's intake manifold by the intake partial vacuum, and is mixed with the incoming primary engine fuel.

It is a principal objective of the invention to provide a significant decrease in the normal gasoline fuel consumption for most types of automotive vehicles.

A further objective of the invention is to provide a progressively increasing volume of hydrogen gas to gasoline ratio mixtures, towards an eventual 100% hydrogen fuel means as the process units are further evolved.

It should be understood that design variations may be made in the detail features of the manifold hydrogen generator units, without departing from the spirit and scope of the invention, as disclosed herein.

Several Disclosure Documents have been filed with the Office which describe the full unit and portions of the present invention.

Disclosure Document (1) No. 081,814—Automotive Steam Reactor Unit for On-Board Hydrogen Power
(2) No. 079,804—Automotive Dual-Mode Hydrogen Generation System.

DESCRIPTION OF THE DRAWINGS

FIG. 4 is an enlarged side cross-section view of a manifold hydrogen generator unit.

FIG. 5 is an enlarged cross-section view through a single rotary iron wire brush of a single manifold hydrogen generator unit.

FIG. 6 is an enlarged cross-section view through the steel wool pack, as the final stage of the manifold hydrogen generator unit.

FIG. 7 is an enlarged cross-section view through a single conveyor fan of a single manifold hydrogen generator.

FIG. 8 is a cross-section through the clutch mechanism.

DESCRIPTION OF THE PREFERRED EMBODIMENT

Figure 1:
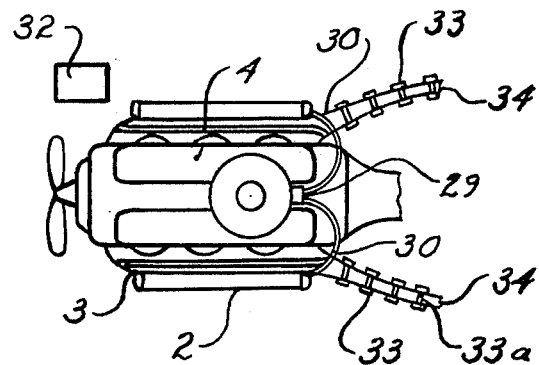
FIG. 1 is a top view of two manifold hydrogen generator units in place on an automotive I.C. engine.
Figure 2:
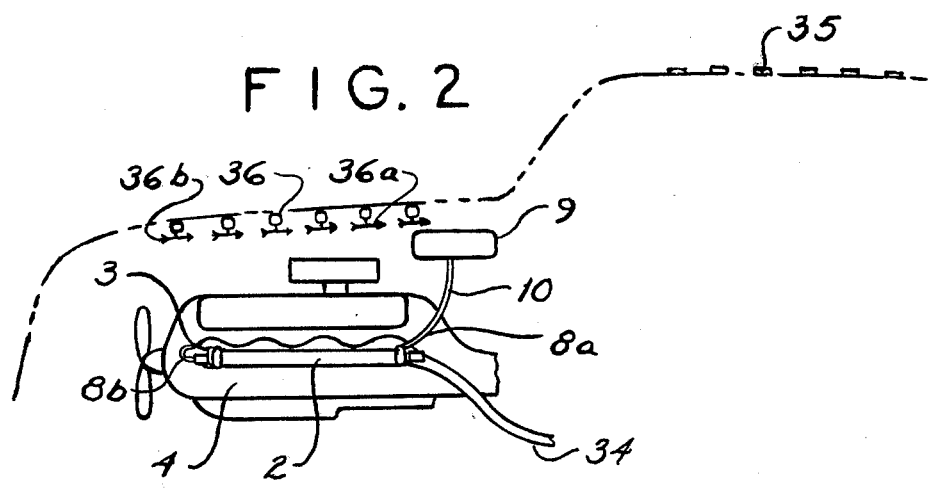
FIG. 2. is a side elevation view of a manifold hydrogen generator unit in place on an automotive I.C. engine.
Figure 3:
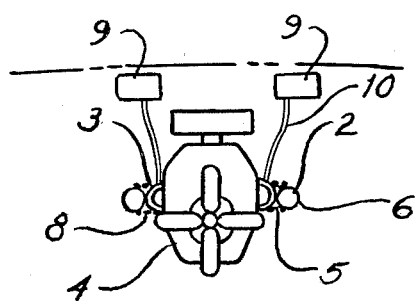
FIG. 3 is a front view of two manifold hydrogen generator units in position on an automotive I.C. engine.

The multiple hydrogen generator unit (s) 1, are comprised of one or two reactor cylinder(s) 2, per vehicle, which are fitted on to the existing exhaust manifold(s) 3, of an automotive I.C. engine 4. The reactor cylinder(s) 2, are adapted to closely match and contact the engine's exhaust manifold(s) 3, by means of adapter mounts 5, which are permanently fastened to the reactor cylinder(s) 2. The adapter mounts 5, are secured to the exhaust manifold(s) 3, by several adjustable clamps 6.

Two identical end caps 7, are threaded on to the reactor cylinder(s) 2, which are approximately two and one-half inches in diameter (I.D.), by about eighteen inches long and made of standard iron pipe (ungalvanized on the I.D.)

Multiple turns of small diameter tubing 8, are closely wound around, and in full contact with both the adapter mounts 5, and the exhaust manifold(s) 3, so that water from raised plastic reservoirs 9, is flashed over to steam in the final tubing loop of the water/steam tubing loops 8.

The water from the reservoirs 9, is conveyed to the inlet tubing loops 8a, by flexible plastic tubing 10. The inlet tubing loop 8a, is located at the top, rear of the exhaust manifold(s) 3, with a minimum of two and one-half turns or loops made around the exhaust manifold(s) 3. The exit end 8b, of the tubing loops 8, is located at the front of the exhaust manifold(s) 3, with the tubing entering the reactor cylinder(s) 2, through the front end cap 7, by means of a threaded connector 8c.

Multiple, uniformly spaced rotary iron wire brushes 11, are closely fitted and in light rubbing contact with the inside diameter of the reactor cylinder(s) 2, and are all revolved by a front central shaft 12, which protrudes through the front of the front end cap 7. A spider support 13, with a centrally located ball or sleeve bearing 14, is closely fitted into the inside diameter of the reactor cylinder(s) 2, and supports the inner end of the front central shaft 12. Another similar ball or sleeve bearing 14, is centrally located within the front end cap 7, to support the front end of the front central shaft 12.

The multiple iron wire brushes 11, are made of a fine iron wire 11a, arrayed in a uniformly dense radial form, and held together with two identical hub discs 11b. The front central shaft 12, should be partially threaded within the reactor cylinder 2, area, so that each brush 11, assembly may be locked into position on the front central shaft 12, with locknuts 11c, on both sides of the hub discs 11b.

The multiple iron wire brushes extend approximately three-quarters of the length of the reactor cylinders(s) 2, so that an adequate iron wire surface area is provided for the steam am reforming process for the unit(s) 1.

A small 12 volt D.C. motor 15, is connected to the front central shaft 12, front protrusion by means of a small coupling 15a. A mounting bracket 15b, is provided as a mounting means for the small motor 15, on the front end cap 7, using conventional hardware. The small motor 15, is connected to the vehicle's primary battery, with a dashboard switch,—controlling the starting and stopping of the small motor 15.

A small rectangular funnel-like air scoop 16, is also mounted to the front end cap 7, and is provided with mounting flanges 16a, for securing the air scoop 16, to the front and cap 7, 7, with conventional hardware. An air inlet port 17, within the front air cap 7, is located at the converging base 16b, of the air scoop 16.

The air inlet port 17, is normally kept closed by a sliding, pivoting gate 18, secured by a pivot pin 18a, to the front end cap 7, the pivoting gate 18, slides on the front surface of the front end cap 7, with an extension arm 18b, connected to a clutch arm 19a of a small friction clutch 19, mounted over the front central shaft 12, protrusion. A small tension spring 19b, keeps tension on the clutch arm 19a, against the direction of rotation of the small D.C. motor 15, so that the pivoting gate 18, is normally kept closed.

The small friction clutch 19, is closely fitted on to the front central shaft 12, protrusion through the front end cap 7, so that the clutch arm 18a, will rotate to open the pivoting gate when the small motor 15, runs.

A small diameter tubing connection 20, conveying a small flow of exhaust gases from the rear of the exhaust manifold(s), is connected to the front end cap 7a, by means of threaded connectors at both ends of the tubing 20.

Approximately three conveyor fans 21, are located directly behind the spider support 13, ans are secured to a rear central shaft 22, which protrudes through the rear end cap 7a.

A small 12 volt D.C. motor 23 is connected to the rear central shaft 22, by means of a small coupling 23a. A mounting bracket 24, is provided as a mounting means for the small motor 23, on to the rear end cap 7a, using conventional hardware.

The small D.C. motor 23, is connected to the vehicle's primary battery, and to the ignition switch so that the conveyor fans are in immediate operation when the vehicle's engine is running. A medium mesh disc screen 25, is positioned directly behind the rear-most conveyor fan 21, to form the front entrance surface for the final steam reforming stage of the process. A clearance hole 25a, is centrally located within the disc screen 25, to clear the rear central shaft 22.

A clearance tube 26, is centrally located over the rear central shaft 22, and is secured to the iside face of the rear end cap 7a, by means of the base flanges 26a, and conventional hardware.

A ball or sleeve bearing 14, is positioned within the rear end cap 7a, to support the rear central shaft 22, along with a similar spider support 13, and bearing 14, in front of the forward-most conveyor fan 21, and behind the first wire brush assembly 11.

The disc screen 25, is secured to the front end of the clearance tube 26, so that a hollow cylindrical compartment is formed for the rear steel wool pack 27. The steel wool pack, 27, is closely packed into this compartment in a random manner with the pack 27, retained within the rear section of the reactor cylinder(s) 2, by the rear end cap 7a.

An exit port 28, is located off-center in the rear end cap 7a, to convey the reformed hydrogen gas to the engine's intake manifold 29, through the flexible tubing line 30, from the rear port exit 28, and the threaded connector 30a.

Multiple resistance heaters 31, with threaded bases 31a, are uniformly located and secured to the reactor cylinder(s) 2, to provide the addition heating level required by this process for automotive applications. All of the multiple resistance heaters 31, are connected to the vehicle's second battery 32, to relieve this extra load from the vehicle's primary battery. The electrical resistance heaters 31, are also connected to the vehicle's ignition circuit so that they are actuated when the vehicle's engine is started and running.

Several electrical generating means must be included in the system to recharge the second battery 32, which consist of multiple thermoelectric cells 33, closely mounted on to the engine exhaust pipes 34, by means of adjustable clamps 33a.

Multiple photovoltaic cells 35, would provide another electrical source with these mounted on portions of the vehicle's roof.

Multiple small air-driven disc/generators 36, will be mounted under the vehicle's front hood to provide a small wattage recharging current to the second battery 32. The air-driven discs consist of thin, flat metal discs 36a, with multiple radial vanes 36b, pitched to receive the incoming air flow under the hood caused by the vehicle's forward motion. The air-driven discs 36a, will be mounted on the shaft of a standard electric small dynamo/generator 36b, with the wattage produced by these components small, but steady and in proportion to the vehicle's forward speed.

A small gear reduction unit,—may be required for the small, front 12 volt D.C. motor 15, which drives the front central shaft 12, and the multiple brushes 11, due to the total frictional resistance of all the brushes 11, in rubbing contact with the inside diameter of the reactor cylinder(s) 2.

A series of about three or four internal tiny ribs or fins 37, 37, on the inside diameter of the reactor cylinder(s) 2, which form long, low protrusions parallel to the shaft axis may be necessary as a jogging or shaking means for the multiple wire brushes 11, to remove rust and carbon accumulations.

A variation on the preferred unit(s) design could consist of manual, cable control opening of the front air inlet gate 18, and the elimination of the automatic friction clutch 19, arrangement previously described. The control cable would terminate at a knob control on the vehicle's dashboard which would be actuated when the front motor switch 15b, is switched on. This manual control would be adopted if the automatic clutch 19, arrangement should prove troublesome and unreliable.

What is claimed is:

1. A manifold hydrogen generator unit for automotive I.C. engines comprised of a cylindrical iron reactor indirectly attached to the existing exhaust manifold of automotive I.C. engines, adapter mounting means permanently fastened to said cylindrical iron reactor and adjustable clamping means for said adapter mounting means on to said existing exhaust manifold, two nearly identical front and rear end caps threaded on to said cylindrical iron reactor, multiple turns of small diameter metal tubing closely wound longitudinally around and in full contact with said adapter mounting means and said existing exhaust manifold, plastic water reservoirs uniformly disposed in a raised position above the engine compartment of a motor vehicle, plastic tubing connection means between said plastic water reservoirs and the rear entrance end of said multiple turns of small diameter metal tubing, the front steam exit end of said multiple turns of small diameter metal tubing is routed to the front end cap threaded on to said cylindrical iron reactor, threaded connector means for securing said small diameter metal tubing to said front end cap, mutliple uniformly spaced rotary iron wire brushes closely fitted in light rubbing contact with the inside diameter of said cylindrical iron reactor, said multiple uniformly spaced rotary iron wire brushes all secured to a front central shaft supported by said front end cap and an internal support spider within said cylindrical iron reactor, low friction bearing means centrally disposed within said fron end cap and said internal support spider for said front central shaft, two identical hub discs hold each of said rotary iron wire brushes in a uniformly dense radial pattern, a major threaded portion disposed on said front central shaft for the securing of each said multiple uniformly spaced rotary iron wire brushes, twin locknuts disposed on either side of each of said two identical hub discs, a small D.C. electric motor disposed at the front of said front end cap connected to said front central shaft by means of a locking coupling, a mounting bracket for securing said small D.C. electric motor to said front end cap, standard hardware means for fastening said mounting bracket and said small D.C. electric motor, an air inlet port axially disposed within said front end cap, a rectangular air scoop located over said air inlet port and secured to said front end cap by means of standard hardware through flanges on said rectangular air scoop, a pivoting metal flap covering said air inlet port disposed in normally closed position over said air inlet port, an arm on said pivoting metal flap connected to an arm on a central friction clutch, spring means on said arms to maintain said pivoting metal flat in a normally closed position over said air inlet port, said central friction clutch disposed over and in rotational friction contact with said front central shaft, a small diameter metal tubing connection disposed between the rear upper portion of said existing manifold, and said front end cap, threaded connection means at both ends of said small diameter metal tubing connection, multiple conveyor fans uniformly disposed within said cylindrical iron reactor reactor directly behind said internal support spider, said multiple conveyor fans fastened to a rear central shaft which protrudes through said rear end cap, a small D.C. electric motor disposed behind said rear end cap and connected to said rear central shaft by means of a locking coupling, a mounting bracket for securing said small D.C. electric motor to said rear end cap, standard hardware means for fastening said mounting bracket and said small D.C. electric motor, said rear central shaft is supported by low friction bearings within said rear end cap and a second internal support spider within said cylindrical iron reactor, a medium mesh disc screen disposed behind the rear most said conveyor fan, a central clearance hole within said medium mesh disc screen to clear said rear central shaft, a hollow clearance tube centrally located over said rear central shaft and secured to the inside face of said rear end cap, said medium mesh disc screen is secured to the front end of said hollow clearance tube, a fine mesh steel wool pack is placed in the rear compartment formed by the medium mesh disc screen within the cylindrical iron reactor and the inside face of said rear end cap, an exit port axially disposed within said rear end cap connected by a metal tubing line on the intake manifold of said automotive I.C. engine, threaded connection means at both ends of said metal tubing line, multiple resistance electrical heaters with threaded bases uniformly disposed and secured into said cylindrical iron reactor, all of said multiple resistance electrical heaters are connected to a second electrical storage battery within the automotive vehicle, several electrical generating means are included within the automotive vehicle as a recharging means for said second electrical storage battery.

2. A manifold hydrogen generator unit according to claim 1, in
which said cylindrical iron reactor consists of standard iron pipe with an inside diameter of between two and three inches and a length of between sixteen and twenty inches, the inside diameter of said cylindrical iron reactor consisting of stand iron pipe is smooth true and free of burrs and abrasions, said cylindrical iron reactor consisting of standard iron pipe is uniformly threaded at both ends and said front and reer end caps have matching threads for connection to said cylindrical iron reactor.

3. A manifold hydrogen generator unit according to claim 1, wherein said small D.C. electric motors are connected to the vehicle's primary electrical battery,
connection of one of said small D.C. electric motors disposed on the said front end cap to a switch mounted on the vehicle's dashboard, connection of the other said small D.C. electric motor disposed on said rear end cap to the vehicle's ignition switch, connection of said multiple resistance electrical heaters to the vehicle's ignition switch.

4. A manifold hydrogen generator unit according to claim 1, in which said several electrical generating means for the said second electrical storage battery partially consist of multiple arrays of thermoelectric cells closely secured to the to the engine's exhaust pipes, multiple arrays of silicon photovoltaic cells on portions of the vehicle's roof, multiple air driven disc/generators uniformly disposed within the vehicle's engine compartment, said multiple air driven disc/generators consist of flat metal discs with multiple cut and pitched vanes, said flat metal discs are fitted and sesured to the shafts of small standard electric dynamos running as generators.

5. A manifold hydrogen generator unit according to claim 1, in which multiple turns of small diameter metal tubing is spirally wound around said existing exhaust manifolds, matching clearance grooves uniformly disposed within said adapter mounting means into which the spirally wound small diameter metal tubing closely fits, a minimum of six and a maximum of twelve spirally wound tubing loops uniformly disposed around a single exhaust manifold, a minimum of two and one-half longitudinal tubing loops and a maximum of four and one-half longitudinal tubing loops disposed around said existing exhaust manifolds of an automotive I.C. engine.

6. Manifold hydrogen generator units for automotive I.C. engines comprised of twin cylindrical iron reactors directly attached to existing dual exhaust manifolds of automotive I.C. engines, adapter mounting means permanently fastened to said twin cylindrical iron reactors, adjustable clamping means for said twin cylindrical iron reactors and adapting mounting means on to said existing dual exhaust manifolds of automotive I.C. engines, two identical front and rear end caps threaded on to said twin cylindrical iron reactors, multiple loops of small diameter metal tubing spirally wound and in full contact with said adapter mounting means and said existing dual manifolds of said automotive I.C. engines, multiple plastic water reservoirs disposed in a raised position above the engine compartment of a conventional motor vehicle, plastic tubing connection means between said multiple plastic water reservoir's and the rear entrance end of said multiple loops of small diameter metal tubing, the steam exit end of said multiple loops of small diameter metal tubing is routed around to the front end cap threaded on to said twin cylindrical iron reactors, threaded connector means for securing said small diameter metal tubing to said front end cap, multiple uniformly spaced rotary iron wire brushes closely fitted in light rubbing contact with the inside diameter of said cylindrical iron reactor, said multiple uniformly spaced rotary iron wire brushes all secured to a front central shaft supported by said front end cap and an internal support spider deep within said cylindrical iron reactor, low friction bearing means centrally disposed within said front end cap and said internal support spider for said front central shaft, two identical hub discs securing said rotary iron wire brushes in a uniformly dense radial pattern, twin locking collars disposed on either side of each of said two identical hub discs over said front central shaft, a small D.C. electric motor disposed at the front of said front end cap and connected to said front central shaft by means of a small locking coupling, a mounting bracket for securing said small D.C. electric motor to said front end cap, standard hardware means for fastening said mounting bracket and said small D.C. electric motor, an air inlet port axially disposed within said front end cap, a rectangular air scoop located over said air inlet port and secured to said front end cap by means of standard hardware through flanges on said rectangular air scoop, a pivoting metal flap covering said air inlet port disposed in a normally closed position, an arm on said pivoting metal flap connected to a control cable terminating at a control knob on the automotive vehicle's dashboard, a small diameter metal tubing connection disposed between the rear upper portion of said exhaust manifolds and said front end cap, threaded connection means at both ends of said small diameter tubing connection, multiple conveyor fans uniformly disposed within the rear portion of said cylindrical iron reactors directly behind said internal support spider, said multiple conveyor fans are fastened to a rear central shaft which protrudes through said rear end cap, a small D.C. motor disposed behind said rear end cap and connected to said rear end cap by means of a small locking coupling, a mounting bracket for securing said small D.C. motor to said rear end cap, standard hardware mounting means for fastening said mounting bracket and said small D.C. motor, said rear central shaft is supported by low friction bearings within said rear end cap and an internal support spider within said cylindrical iron reactor, a fine mesh screen disc disposed behind the rearmost said conveyor fan, a central clearance hole disposed within said fine mesh screen disc to clear said rear central shaft, a hollow clearance tube centrally located over said rear central shaft and secured to the inside face of said rear end cap, said fine mesh screen disc is secured to the front end of said hollow clearance tube, a fine mesh steel wool pack is disposed within the rear portion of said cylindrical iron reactor formed by said fine mesh screen disc and the inside face of said rear end cap, an exit port axially disposed within said rear end cap is connnected by a metal tubing loop with said automotive I.C. engine's intake manifold, threaded connection means at both ends of said metal tubing loop, multiple resistance electrical heaters with threaded bases uniformly disposed and secured into said cylindrical iron reactors, all of said multiple resistance electrical heaters are connected to a second electrical storage battery within the said automotive vehicle, several electrical generating means included within the said automotive vehicle as a recharging means for said second electrical storage battery.

7. Manifold hydrogen generator units for for automotive I.C. engines according to claim 6, in which said mulitple loops of small diameter tubing spirally wound around said existing exhaust manifolds is formed with a minimum of eight loops and a maximum of twelve loops around a single existing exhaust manifold, matching grooves uniformly disposed within said adapter mounting means into which said spirally wound small diameter tubing closely fits, said multiple loops of small diameter tubing is formed from standard copper tubing.

8. Manifold hydrogen generator units for automotive I.C. engines according to claim 6, wherein said twin cylindrical iron reactors are fitted with a longitudinal series of tiny ribs uniformly disposed on the inside diameter, said longitudinal series of tiny ribs are smooth over their entire surfaces and are disposed in the zone of said multiple uniformly spaced rotary iron wire brushes, a minimum of two said longitudinal series of tiny ribs and a maximum of four said longitudinal series of tiny ribs equally spaced around the inside diameter of said cylindrical iron reactors, said twin cylindrical iron reactors consist of standard iron pipe with an inside diameter of between two and four inches and a length of between fifteen and twenty-four inches, the inside diameter of said cylindrical iron reactors consisting of standard iron pipe is smooth and free of burrs and abrasions.

9. Manifold hydrogen generator units for automotive I.C. engines according to claim 6, in which said small D.C. electric motor disposed at the front of said front end cap is provided with a small matching gear reduction unit for a torque increase for said front central shaft, said small matching gear reduction unit is mounted to said mounting bracket along with said small D.C. electric motor, connection of said small D.C. electric motors to the vehicle's primary electrical battery, connection of said small D.C. electric motor disposed at the front of said front end cap to an electrical switch mounted on the vehicle's dashboard, connection of the other rear said small D.C. electric motor disposed on said rear end cap to the vehicle's ignition switch, connection of said multiple resistance electrical heaters to the vehicle's ignition switch.

10. Manifold hydrogen generator units for automotive I.C. engines according to claim 6, wherein said several electrical generating means for the said second electrical storage battery ery partially consist of multiple arrays of Seebeck effect thermoelectric cells closely attached to the automotive I.C. engine's exhaust pipes, said several electrical generating means for said second electrical storage battery partially consist of multiple arrays of silicon photovoltaic cells or amorphous silicon film uniformly mounted on portions of the vehicle's roof, multiple air driven disc generators uniformly disposed within the vehicle's engine compartment in the zone of the incoming air flow, said multiple air driven disc generators consisting of flat metal discs with multiple cut and pitched vanes.

* * * * *